United States Patent
Youn

(10) Patent No.: US 7,450,642 B2
(45) Date of Patent: Nov. 11, 2008

(54) FAST MOTION VECTOR PREDICTION METHOD

(75) Inventor: Jeongnam Youn, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 849 days.

(21) Appl. No.: 10/294,786

(22) Filed: Nov. 13, 2002

(65) Prior Publication Data

US 2004/0091048 A1 May 13, 2004

(51) Int. Cl.
*H04N 7/12* (2006.01)
(52) U.S. Cl. .............. 375/240.16; 375/240; 375/240.01; 375/240.12
(58) Field of Classification Search ............... 375/240, 375/240.01, 240.12, 240.16, 240.17, 240.24; 348/699
See application file for complete search history.

(56) References Cited

U.S. PATENT DOCUMENTS 5,790,206 A * 8/1998 Ju .............................. 348/699
6,175,593 B1 * 1/2001 Kim et al. ............. 375/240.17
6,208,693 B1 * 3/2001 Chen et al. ............ 375/240.24

* cited by examiner

*Primary Examiner*—Allen Wong
(74) *Attorney, Agent, or Firm*—John P. O'Banion

(57) ABSTRACT

A method of rapidly generating motion vector predictions based on vertical and horizontal position categorization of macroblocks within a video object plane (VOP) for use within a video decoder or encoder. By way of example, the location of the subject macroblock is categorized vertically as either Upper_Edge or Not_Upper_Edge, and horizontally as either Left_Edge, Right_Edge, or Not_Edge. The position categories are utilized in conjunction with selected block number (Block1 through Block4) within the luminance macroblock within a decision-tree which generates three predictors MV1, MV2, and MV3. The prediction rules may be implemented within hardware, software, or combinations thereof, within both video encoders and decoders, such as according to the MPEG-4, H.263, or similar standards.

31 Claims, 9 Drawing Sheets

For PMV1:
- PMV1 = 0           if (Block1 || Block3) & Left_Edge
- PMV1 = LeftMV[0]   if Block1 & Upper_Edge & Left_Edge
- PMV1 = MV1         if Block2
- PMV1 = LeftMV[1]   if Block3 & & Left_Edge
- PMV1 = MV3         if Block4

For PMV2:
- PMV2 = 0           if Block1 & Upper_Edge & Left_Edge
- PMV2 = PMV1        if Block1 & Upper_Edge & Left_Edge
- PMV2 = UpperMV[bx] if (Block1 & Not_Upper_Edge) | (Block2 & Upper_Edge & Right_Edge)
- PMV2 = MV1         if (Block2 & Upper_Edge) | Block3 | Block4
- PMV2 = UpperMV[bx+1] if Block2 & Not_Upper_Edge & !Not_Edge For PMV3:
- PMV3 = 0           if (Block1 & Upper_Edge & Left_Edge) | (Block1 & Not_Upper_Edge & Right_Edge) | (Block2 & Not_Upper_Edge & Left_Edge)
- PMV3 = PMV2        if Block1 & Upper_Edge & Left_Edge
- PMV3 = UpperMV[bx+2] if (Block1|Block2) & Not_Upper_Edge&Right_edge
- PMV3 = MV1         if Block1 & Upper_Edge
- PMV3 = MV2         if Block3 & Block4

FIG. 9

FAST MOTION VECTOR PREDICTION METHOD

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the public files or records of the United States Patent and Trademark Office, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to video processing, and more particularly to a method of performing rapid motion vector prediction using horizontal and vertical categorization.

2. Description of the Background Art

Video bit streams are conventionally processed within macroblocks that contain a luminance component and spatially associated chrominance components. A common video macroblock structure is that of a conventional 4:2:0 having a total of 6 blocks, shown numbered one through six. The 4:2:0 structure holds 4Y, 1 Cb, and 1 Cr block, with a block order as depicted within FIG. 1.

An inter-coded macroblock comprises either one motion vector for the complete macroblock or K motion vectors, wherein ($1 < K \leq 4$). One motion vector is associated with each 8×8 block forming the 16×16 macroblocks. Each macroblock may be encoded as an INTRA or an INTER coded macroblock. The coding of an INTRA coded macroblock only utilizes information from that particular macroblock. By contrast, an INTER coded macroblock utilizes information from both itself and from the reference video-object plane (VOP). The information for the reference video-object plane is obtained through motion compensation. A two-dimensional vector is utilized for motion compensation of the macroblocks, which provides an offset from the coordinate position within the current picture to the coordinates within a reference video-object plane.

In decoding a motion vector $MV=(MV_x, MV_y)$ of a macroblock, the differential motion vector $MVD=(MVD_x, MVD_y)$ is extracted from the bit-stream by utilizing variable length decoding, whereupon it is added to a motion vector predictor, such as given by P=(Px, Py), on a component-by-component basis to form the final motion vector. It will be appreciated, therefore, that the horizontal and vertical motion vector components are decoded differentially by using a prediction, such as may be formed by median filtering of three vector candidate predictors (MV1, MV2, MV3) from the spatial neighborhood comprising the blocks and macroblocks which have already been decoded. FIG. 2 through FIG. 5 depict four possible spatial positions of candidate predictors (MV1, MV2, MV3) for each macroblock.

The following set of four decision-rules are applied to obtain the value of the three candidate predictors:

1. If a candidate predictor $MV_i$ is in a transparent spatial neighborhood macroblock, or in a transparent block of the current macroblock, it is not valid; otherwise, it is set to the corresponding block vector.
2. If one and only one candidate predictor is not valid, then it is set to zero.
3. If two and only two candidate predictors are not valid, then they are set to the third candidate predictor.
4. If all three candidate predictors are not valid, then they are all set to zero.

The median value of the three candidates for the same component is computed as a predictor, denoted by $P_x$ and $P_y$, as given by:

$$P_x = \text{Median}(MV1_x, MV2_x, MV3_x)$$

$$P_y = \text{Median}(MV1_y, MV2_y, MV3_y)$$

By way of example, if MV1=(−2, 3), MV2=(1, 5), and MV3=(−1, 7), then $P_x$=−1 and $P_y$=5.

The conventional process by which the motion vectors are obtained is complicated by the fact that every condition described in the previous section must be evaluated. It will be appreciated, therefore, that a large number of decision rules are currently required that must be supported in hardware and software when encoding or decoding motion vectors.

Therefore, a need exists for a method of rapidly predicting motion vectors which are subject to a reduced number of rules and whose implementation is subject to less overhead than required by conventional methodology. The present invention satisfies those needs, as well as others, and overcomes the deficiencies of previously developed prediction methods.

BRIEF SUMMARY OF THE INVENTION

A fast prediction method is described which may be implemented cost-effectively in hardware, software, or in combinations thereof, to arrive at predictions in less time than conventional prediction methods allow. The methods described may be utilized within decoders and/or decoders utilizing any convenient protocol and is well suited for use within MPEG-4 and H.263 video coding standards. The method first categorizes the position of the macroblock in relation to its vertical and horizontal position. By way of example, the positions may be categorized in relation to whether the macroblocks are proximal to an edge of the video object plane (VOP). Specifically, the vertical direction is categorized into two categories (states) depending on proximity to the upper edge of the VOP, comprising categories Upper_Edge, and Not_Upper_Edge. The horizontal direction is categorized into three possible categories (states) comprising Left_Edge, Right_Edge, and Not_Edge. These positions are utilized within a decision tree in combination with the block number within the macroblock to derive a motion vector prediction. It will be appreciated that the method of the present invention may be implemented easily and efficiently in either hardware or software within a video encoder or decoder, such as one adhering to the MPEG-4, or H.263 standard.

An object of the invention is to rapidly generate motion vector predictions.

Another object of the invention is to allow for the generation of motion vector predictions that may be implemented in either hardware, or software.

Another object of the invention is to allow for the generation of motion vector predictions that may be easily and cost-effectively implemented.

Another object of the invention is to utilize position categories to drive a decision-tree for the generation of motion vectors.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 1 is a diagram of macroblock structures for a conventional 4:2:0 macroblock consisting of 6 blocks as utilized within a majority of video decoders.

FIG. 2 is a diagram of a first position of candidate predictors MV1, MV2, and MV3, for each of the luminance blocks within a conventional macroblock.

FIG. 3 is a diagram of a second position of candidate predictors MV1, MV2, and MV3, for each of the luminance blocks within a conventional macroblock.

FIG. 4 is a diagram of a third position of candidate predictors MV1, MV2, and MV3, for each of the luminance blocks within a conventional macroblock.

FIG. 5 is a diagram of a fourth position of candidate predictors MV1, MV2, and MV3, for each of the luminance blocks within a conventional macroblock.

FIG. 9 is a listing of a motion vector predictor decision-tree for generating three predictor values PMV1, PMV2, and PMV3, according to an embodiment of the present invention, showing determinations of the predictor in response to macroblock position categories and block number.

DETAILED DESCRIPTION OF THE INVENTION

Referring more specifically to the drawings, for illustrative purposes the present invention is embodied in the apparatus generally shown in FIG. 6 through FIG. 10. It will be appreciated that the apparatus may vary as to configuration and as to details of the parts, and that the method may vary as to the specific steps and sequence, without departing from the basic concepts as disclosed herein.

Location information within a macroblock is first categorized into states in response to horizontal and vertical components. The vertical direction is preferably classified into two cases (states), wherein the current macroblock is categorized as either being located on the upper-edge (Upper_Edge), or not being located on the upper-edge (Not_Upper_Edge). The horizontal direction is preferably classified into three cases (states), wherein the current macroblock is either located on the left-edge (Left_Edge), on the right-edge (Right_Edge), or not on an edge (Not_Edge). It should be appreciated that the term "edge" as used herein is generally synonymous with the "boundary" of the video object plane (VOP). It will be further appreciated that alternative categorization conditions may be implemented by one of ordinary skill in the art without departing from the teachings of the present invention.

Figure 6:
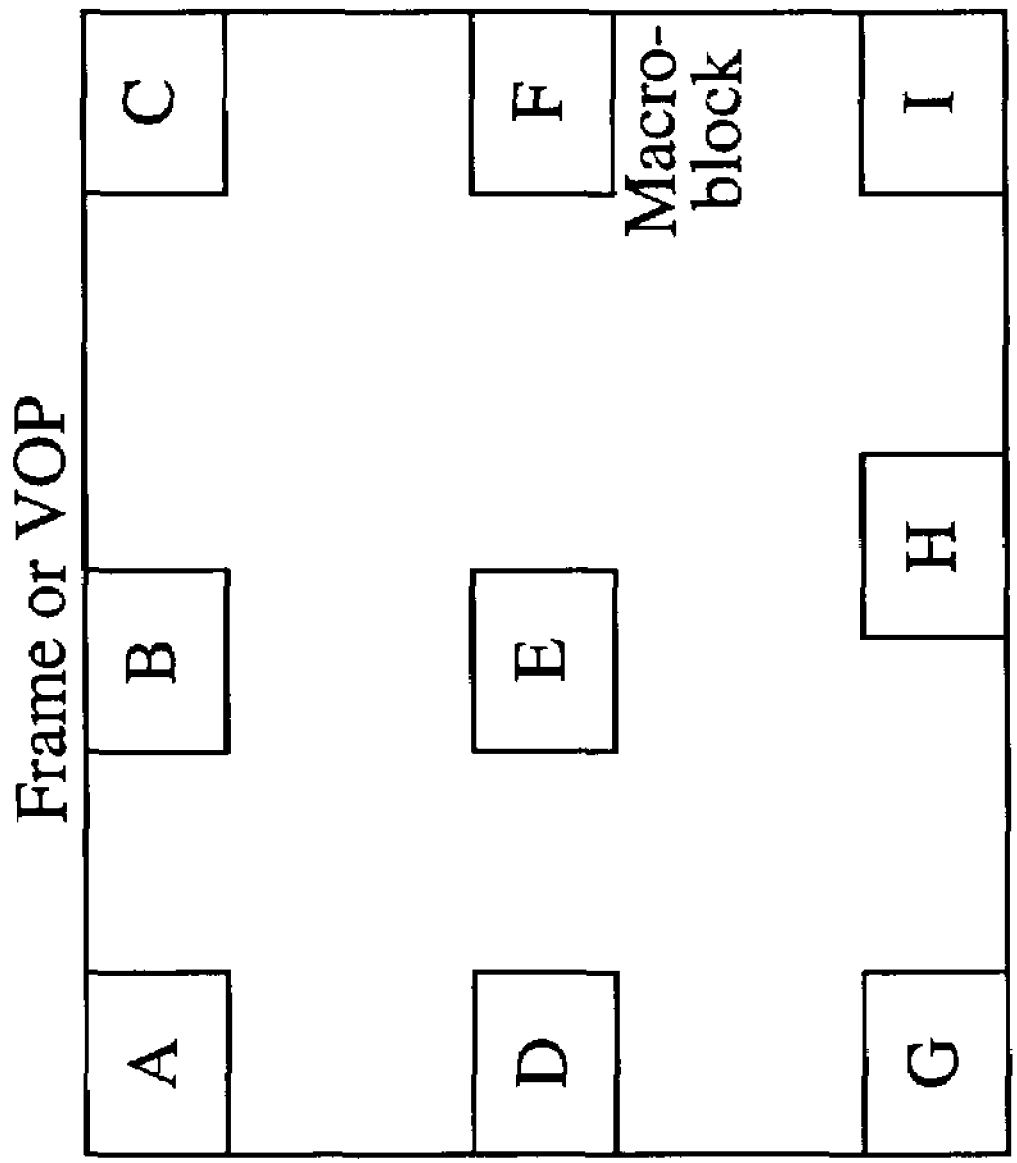
FIG. 6 is a block diagram of possible macroblock positions within a conventional video reference frame, wherefrom the macroblock position categories utilized according to an aspect of the present invention are derived.
Figure 7A:
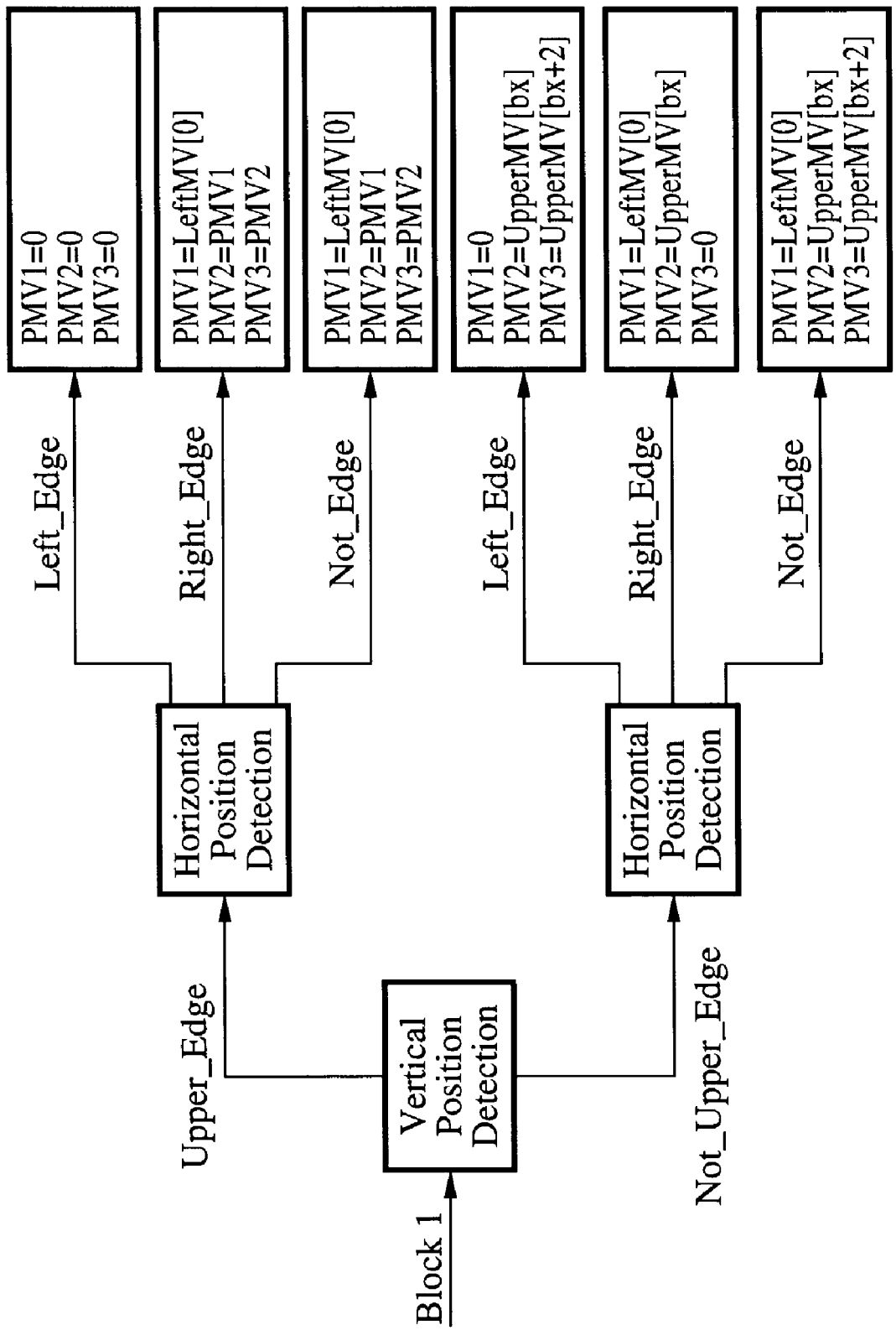
FIG. 7A through 7D are flowcharts of a motion vector prediction decision-tree according to an aspect of the present invention, shown determining motion vector predictors for each block position (1-4) in response to macroblock position categories.
Figure 7B:
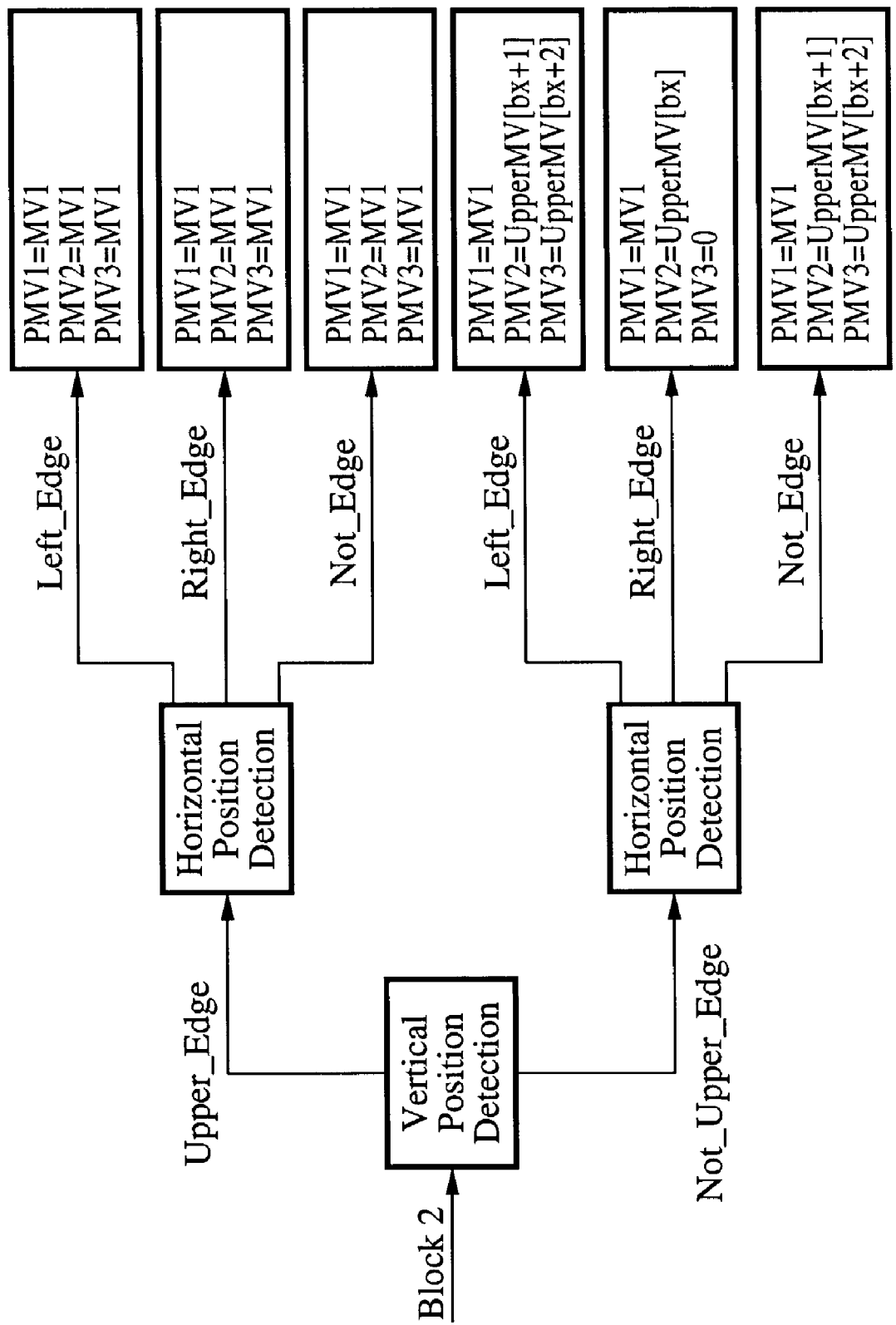
Figure 7C:
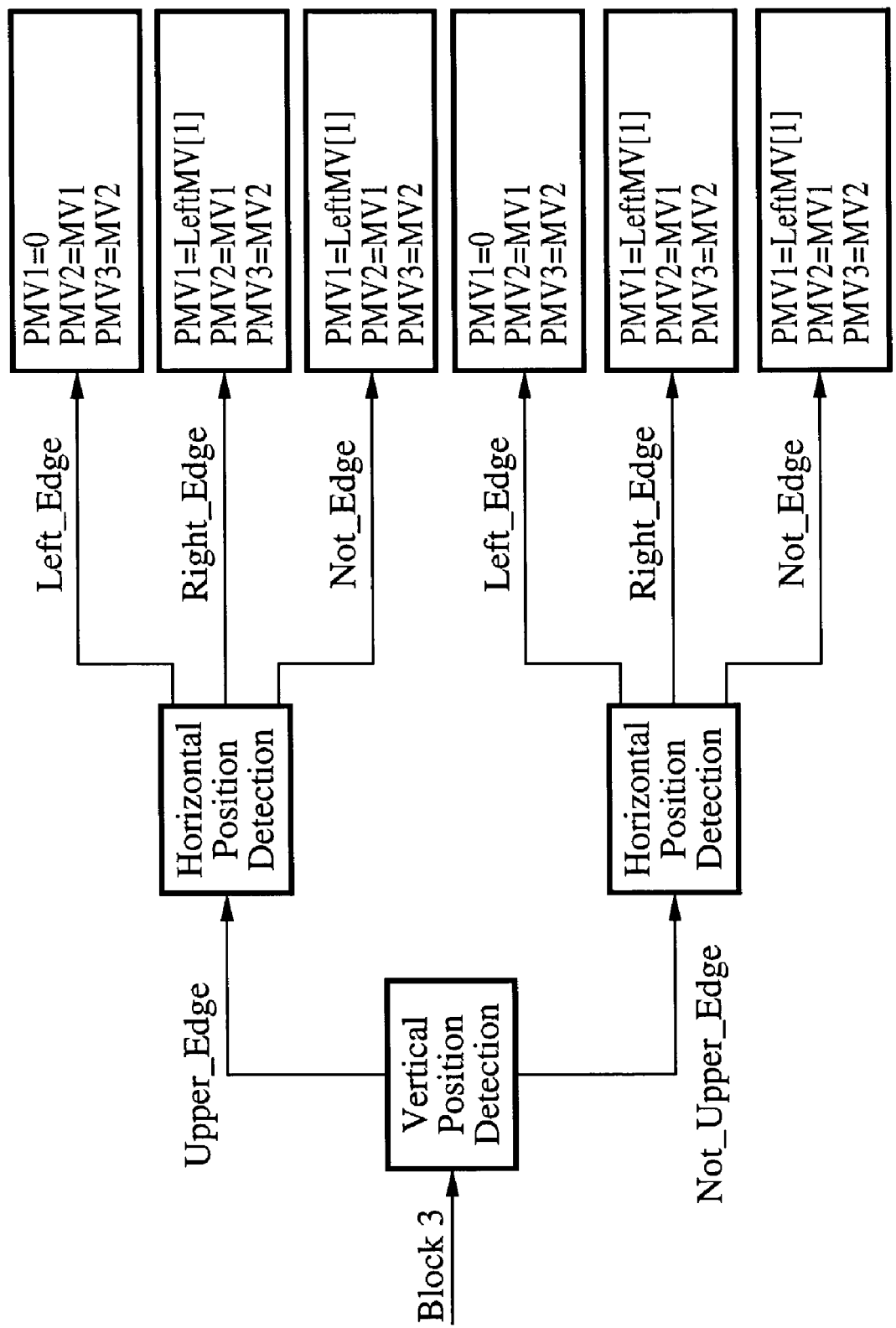
Figure 7D:
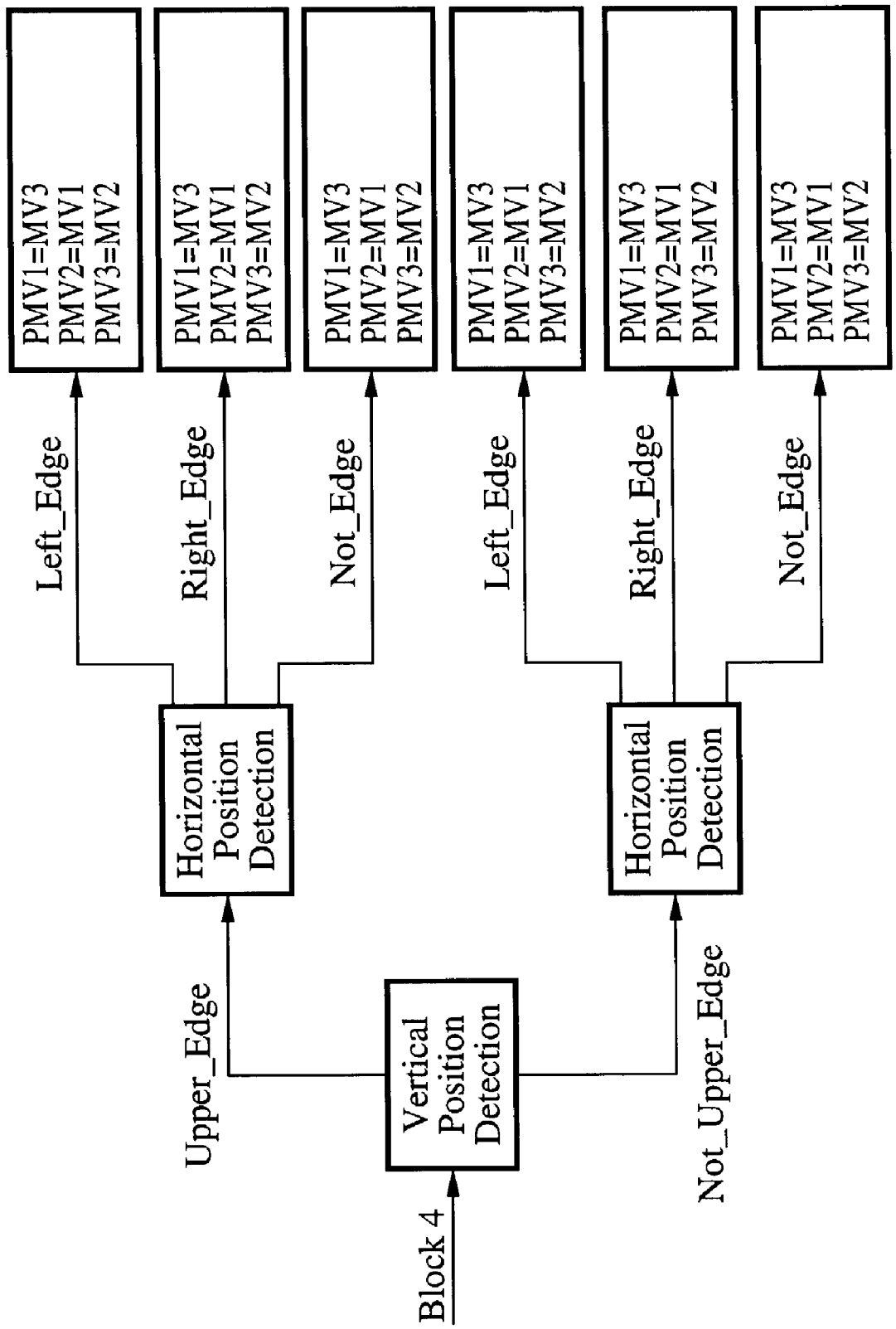
Figure 8:
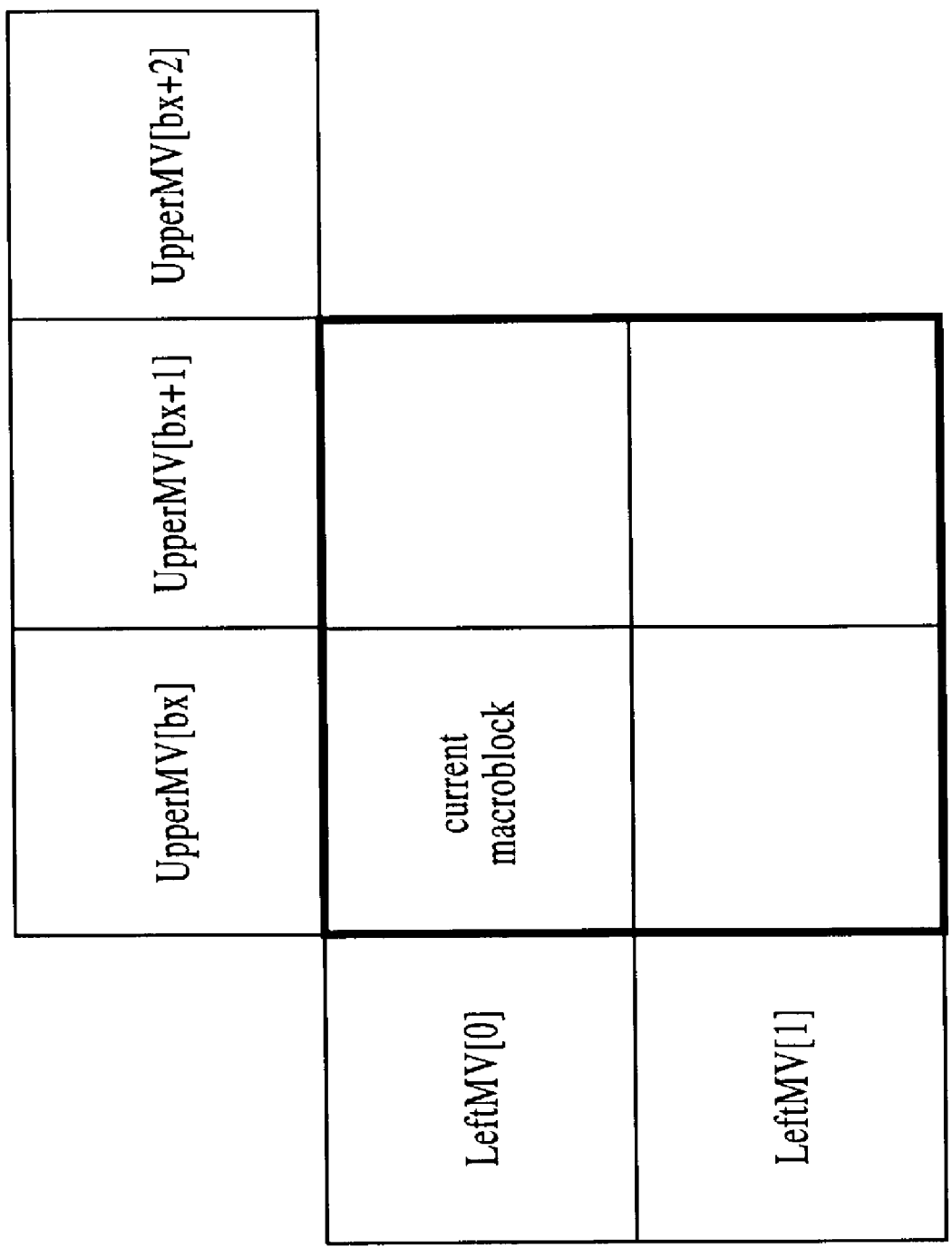
FIG. 8 is a diagram of motion vector candidates according to an aspect of the present invention, showing LeftMV[1], LeftMV[0], UpperMV[bx], UpperMV[bx+1] and UpperMV[bx+2] in relation to the current macroblock comprising four blocks.

FIG. 6 illustrates nine microblock positions within a single reference video-object plane, referenced as letters A through I. These categories are listed in Table 1 indicating how each location is categorized according to the above vertical and horizontal criteria. By utilizing the described categorization rules, a set of motion vector predictor steps are described by FIG. 7A through FIG. 7D for categorizing macroblock positions within a reference video-object plane. The method is initiated with a block number for which a motion vector prediction is desired, and then traverses a decision-tree based on macroblock position categories towards resultant motion vector predictions which are preferably provided as a set of three motion vector predictions, PMV1, PMV2, and PMV3, or their equivalent. The macroblock locations are determined by current macroblock position ($mb_x$, $mb_y$), which can be converted into block locations by considering that $b_x=mb_x<<1$ and $b_y=mb_y<<1$. The candidate motion vectors are stored with two candidates in LeftMV and three candidates in UpperMV, as illustrated within FIG. 8. Upon obtaining the final motion vector, the values are stored in memory for use within a subsequent motion vector prediction.

The method described in FIG. 7A through FIG. 7D may be further simplified by combining all the blocks together instead of generating a set of motion vector predictors for each block. As a result, only the three predictors are computed which are illustrated in the following decision-tree which is derived from FIG. 7A through FIG. 7D.

PMV1=0 if
Block1 & Upper_Edge & Left_Edge
Block1 & Not_Upper_Edge & Left_Edge
→Block1 & Left_Edge
Block3 & Upper_Edge & Left_Edge
Block3 & Not_Upper_Edge & Left_Edge
→Block3 & Left_Edge
→(Block1|Block3) & Left_Edge
PMV1=LeftMV[0] if
Block1 & Upper_Edge & Right_Edge
Block1 & Upper_Edge & Not_Edge
→Block1 & Upper_Edge & Left_Edge
PMV1=MV1 if
Block2 & Upper_Edge & Left_Edge
Block2 & Upper_Edge & Right_Edge Block2 & Upper_Edge & Not_Edge
Block2 & Not_Upper_Edge & Left_Edge
Block2 & Not_Upper_Edge & Right_Edge
Block2 & Not_Upper_Edge & Not_Edge
→Block2
PMV1=LeftMV[1] if
Block3 & Upper_Edge & Right_Edge
Block3 & Upper_Edge & Not_Edge
→Block3 & Upper_Edge & Left_Edge
Block3 & Not_Upper_Edge & Right_Edge
Block3 & Not_Upper_Edge & Not_Edge
→Block3 & Not_Upper_Edge & Left_Edge
→Block3 & Left_Edge
PMV1=MV3 if
Block4 & Upper_Edge & Left_Edge
Block4 & Upper_Edge & Right_Edge
Block4 & Upper_Edge & Not_Edge
Block4 & Not_Upper_Edge & Left_Edge
Block4 & Not_Upper_Edge & Right_Edge
Block4 & Not_Upper_Edge & Not_Edge
→Block4
PMV2=0 if
Block1 & Upper_Edge & Left_Edge
PMV2=PMV1 if
Block1 & Upper_Edge & Right_Edge
Block1 & Upper_Edge & Not_Edge
→Block1 & Upper_Edge & Left_Edge
PMV2=UpperMV[bx] if
Block1 & Not_Upper_Edge & Left_Edge
Block1 & Not_Upper_Edge & Right_Edge
Block1 & Not_Upper_Edge & Not_Edge
→Block1 & Not_Upper_Edge
Block2 & Not_Upper_Edge & Right_Edge
PMV2=MV1 if
Block2 & Not_Upper_Edge & Left_Edge
Block2 & Not_Upper_Edge & Right_Edge
Block2 & Not_Upper_Edge & Not_Edge
→Block2 & Upper_Edge
Block3 & Upper_Edge & Left_Edge
Block3 & Upper_Edge & Right_Edge
Block3 & Upper_Edge & Not_Edge
Block3 & Not_Upper_Edge & Left_Edge
Block3 & Not_Upper_Edge & Right_Edge
Block3 & Not_Upper_Edge & Not_Edge
→Block3
Block4 & Upper_Edge & Left_Edge
Block4 & Upper_Edge & Right_Edge
Block4 & Upper_Edge & Not_Edge
Block4 & Not_Upper_Edge & Left_Edge
Block4 & Not_Upper_Edge & Right_Edge
Block4 & Not_Upper_Edge & Not_Edge
→Block4
PMV2=UpperMV[bx+1] if
Block2 & Not_Upper_Edge & Left_Edge
Block2 & Not_Upper_Edge & Right_Edge
→Block2 & Not_Upper_Edge & Not_Edge
PMV3=0 if
Block1 & Upper_Edge & Left_Edge
Block1 & Not_Upper_Edge & Right_Edge
Block2 & Not_Upper_Edge & Right_Edge
PMV3=PMV2 if
Block1 & Upper_Edge & Right_Edge
Block1 & Upper_Edge & Not_Edge
→Block1 & Upper_Edge & Left_Edge
PMV3=UpperMV[bx+2] if
Block1 & Not_Upper_Edge & Left_Edge
Block1 & Not_Upper_Edge & Not_Edge
→Block1 & Not_Upper_Edge & Right_Edge
Block2 & Not_Upper_Edge & Left_Edge
Block2 & Not_Upper_Edge & Not_Edge
→Block2 & Not_Upper_Edge & Right_Edge
→(Block1|Block2) & Not_Upper_Edge & Right_Edge
PMV3=MV1 if
Block1 & Upper_Edge & Left_Edge
Block1 & Upper_Edge & Right_Edge
Block1 & Upper_Edge & Not_Edge
→Block 1 & Upper_Edge
PMV3=MV2 if
Block3 & Upper_Edge & Left_Edge
Block3 & Upper_Edge & Right_Edge
Block3 & Upper_Edge & Not_Edge
Block3 & Not_Upper_Edge & Left_Edge
Block3 & Not_Upper_Edge & Right_Edge
Block3 & Not_Upper_Edge & Not_Edge
→Block3
Block4 & Upper_Edge & Left_Edge
Block4 & Upper_Edge & Right_Edge
Block4 & Upper_Edge & Not_Edge
Block4 & Not_Upper_Edge & Left_Edge
Block4 & Not_Upper_Edge & Right_Edge
Block4 & Not_Upper_Edge & Not_Edge
→Block4
→(Block3|Block4)

The above decision-tree for generating motion vector prediction is depicted after simplification within FIG. 9. It will be appreciated that each of the three motion vector predictions may be directly determined in response to block number and macroblock position categorization information.

Figure 10:
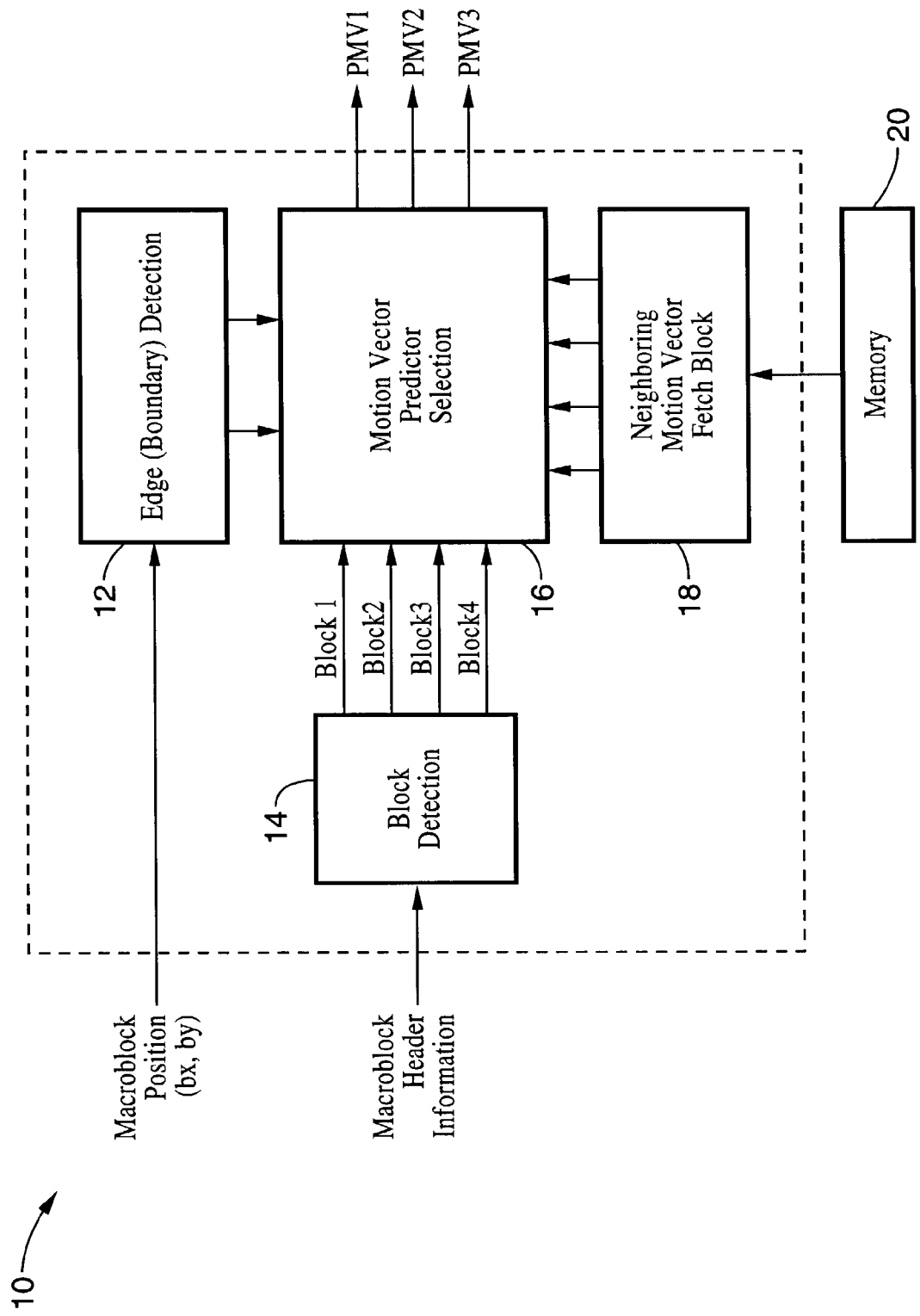
FIG. 10 is a block diagram of a motion vector prediction device according to an embodiment of the present invention, shown utilizing position categorization by edge, block detection, and the determination of motion vector predictors in relation to neighboring motion vectors stored in memory.

FIG. 10 depicts the present motion prediction method implemented within a device 10 according to the above rules which may be employed within a video encoder or decoder design. The "edge-detection" block 12 determines the macroblock position both horizontally and vertically. The "block detection" block 14 generates a current block number that is to be processed. The "motion vector prediction selection" block 16 contains the rules described, and operates in response to information from "neighboring motion vector fetch block" 18 in relation to memory 20. It will be appreciated that the steps for performing the present method may be readily implemented in hardware, software, or combinations thereof. The simplicity of the underlying prediction rules allow for the implementation of vector prediction algorithms within encoders and decoders which execute in less time than those obtained when employing conventional prediction methodologies.

Accordingly, it will be seen that this invention provides an easily implemented method for determining motion vector predictions rapidly. The algorithms and decision-trees which are described within the invention are provided by way of example, and not of limitation, and it should therefore be appreciated that one of ordinary skill in the art may alter the categorization of position and the structure of the decision-trees without departing from the present invention.

Although the description above contains many specificities, these should not be construed as limiting the scope of the invention, but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Vertical and Horizontal Position Categorization of Macroblocks shown in FIG. 6

| Macroblock | Vertical | | Horizontal | | |
|---|---|---|---|---|---|
| | Upper_Edge | Not_Upper_Edge | Left_Edge | Right_Edge | Not_Edge |
| A | Y | N | Y | N | N |
| B | Y | N | N | N | Y |
| C | Y | N | N | Y | N |
| D | N | Y | Y | N | N |
| E | N | Y | N | N | Y |
| F | N | Y | N | Y | N |
| G | N | Y | Y | N | N |
| H | N | Y | N | N | Y |
| I | N | Y | N | Y | N |

What is claimed is:

1. A method of rapidly determining motion vector predictions for luminance blocks within a macroblock, comprising:
   categorizing the location of a macroblock horizontally and vertically within a video object plane;
   said categorizing of location is performed to determine a location category, and not the coordinate position of the macroblock, wherein the number of location categories is less than the number of coordinate positions available in the macroblock; and
   traversing a decision tree, with branches based on location category, for each luminance block to arrive at a subset of motion vector prediction rules;
   generating a set of motion vector predictions in response to inputting block numbers for said luminance blocks within each respective said subset of motion vector prediction rules as selected on the basis of location category in traversing the decision tree.

2. A method as recited in claim 1, wherein said categorizing the position of a macroblock within the video object plane, comprises:
   (a) generating a vertical descriptor of block position; and
   (b) generating a horizontal descriptor of block position.

3. A method as recited in claim 2, wherein said categorizing of block location is performed for a selected block number within the set of block numbers consisting of Block1, Block2, Block3, and Block4, or equivalents.

4. A method as recited in claim 2, wherein said generating of said vertical descriptor is based on a determination of whether said block is located on an upper-edge (Upper_Edge) of said video object plane, or is not located on an upper edge (Not_Upper_Edge).

5. A method as recited in claim 2, wherein said generating of said horizontal descriptor is based on a determination of whether said block is located on a right-edge (Right_Edge), a left-edge (Left_Edge), or is not located on either edge (Not_Edge).

6. A method as recited in claim 2, wherein said horizontal and vertical descriptors are utilized within a decision tree to arrive at three motion vector predictors PMV1, PMV2, and PMV3.

7. A method as recited in claim 6, wherein said vector motion predictor PMV1 is calculated by evaluating the decision tree, comprising:
   PMV1=0 if (Block1||Block3) & Left_Edge;
   PMV1=LeftMV[0] if Block1 & Upper_Edge & Left_Edge;
   PMV1=MV1 if Block2;
   PMV1=LeftMV[1] if Block3 & & Left_Edge; and
   PMV1=MV3 if Block4.

8. A method as recited in claim 6, wherein said vector motion predictor PMV2 is calculated by evaluating the decision tree, comprising:
   PMV2=0 if Block1 & Upper_Edge & Left_Edge;
   PMV2=PMV1 if Block1 & Upper_Edge & Left_Edge;
   PMV2=UpperMV[bx] (Block1 & Not_Upper_Edge)| (Block2 & Upper_Edge & Right_Edge);
   PMV2=MV1 if (Block2 & Upper_Edge)|Block3|Block4; and
   PMV2=UpperMV[bx+1] if Block2 & Not_Upper_Edge & !Not_Edge.

9. A method as recited in claim 6, wherein said vector motion predictor PMV3 is calculated by evaluating the decision tree, comprising:
   PMV3=0 if (Block1 & Upper_Edge & Left_Edge)| (Block1 & Not_Upper_Edge & Right_Edge)|(Block2 & Not_Upper_Edge & Left_Edge);
   PMV3=PMV2 if Block1 & Upper_Edge & Left_Edge;
   PMV3=UpperMV[bx+2] if (Block1|Block2) & Not_Upper_Edge&Right_edge;
   PMV3=MV1 if Block1 & Upper_Edge; and
   PMV3=MV2 if Block3 & Block4.

10. A method as recited in claim 6, wherein said motion vector predictions are generated for an MPEG-4, or H.263, bit-stream.

11. A method as recited in claim 1, wherein said location categorization and motion vector prediction generation are executed in association with a video encoder or video decoder.

12. A method of rapidly generating motion vector predictors, comprising:

detecting edge boundaries from received macroblock position information in relation to macroblock position within the video object plane to generate a location category;

determining a current block number from received header information;

fetching motion vectors for neighboring blocks from memory;

traversing a decision tree, with branches based on said location category, to arrive at a subset of motion vector prediction rules; and predicting a set of motion vectors for said current block from said subset of motion vector prediction rules as selected on the basis of said detected edge boundaries into which said block number within said macroblock in relation to said neighboring blocks is entered.

13. A method of rapidly predicting motion vectors for luminance blocks within a macroblock, comprising:

generating a vertical descriptor of macroblock position within the video object plane;

generating a horizontal descriptor of macroblock position within the video object plane;

said horizontal and vertical descriptors comprise edge position categories in relation to the edges of the video object plane;

traversing a decision tree, with branches based on said edge position categories, to arrive at a subset of motion vector prediction rules; and generating a set of motion vector predictions from said subset of motion vector prediction rules as selected on the basis of said edge position categories, in response to inputting said block number of said luminance blocks into the selected subset of motion vector prediction rules.

14. A method as recited in claim 13, wherein said generating of said vertical descriptor comprises determining whether said block is located on an upper-edge (Upper_Edge) of said video object plane, or is not located on an upper edge (Not_Upper_Edge).

15. A method as recited in claim 14, wherein said generating of said horizontal descriptor comprises determining whether or not said block is located on a right-edge (Right_Edge), a left-edge (Left_Edge), or is not located on either edge (Not_Edge).

16. A method as recited in claim 13, wherein a separate said decision tree is traversed for each selected block number within the set of block numbers consisting of Block1, Block2, Block3, and Block4.

17. A method as recited in claim 13, wherein said motion vector predictions comprise three predictors, PMV1, PMV2, and PMV3, or equivalents.

18. A method as recited in claim 17, wherein said vector motion predictor PMV1 is calculated by evaluating the decision tree comprising:

PMV1=0 if (Block1||Block3) & Left_Edge;
PMV1=LeftMV[0] if Block1 & Upper_Edge & Left_Edge;
PMV1=MV1 if Block2;
PMV1=LeftMV[1] if Block3 & & Left_Edge; and
PMV1=MV3 if Block4.

19. A method as recited in claim 17, wherein said vector motion predictor PMV2 is calculated by evaluating the decision tree comprising:

PMV2=0 if Block1 & Upper_Edge & Left_Edge;
PMV2=PMV1 if Block1 & Upper_Edge & Left_Edge;
PMV2=UpperMV[bx] if (Block1 & Not_Upper_Edge)|(Block2 & Upper_Edge & Right_Edge);
PMV2=MV1 if (Block2 & Upper_Edge)|Block3|Block4; and
PMV2=UpperMV[bx+1] if Block2 & Not_Upper_Edge & !Not_Edge.

20. A method as recited in claim 19, wherein said vector motion predictor PMV3 is calculated by evaluating the decision tree comprising:

PMV3=0 if (Block1 & Upper_Edge & Left_Edge)|(Block1 & Not_Upper_Edge & Right_Edge)|(Block2 & Not_Upper_Edge & Left_Edge);
PMV3=PMV2 if Block1 & Upper_Edge & Left_Edge;
PMV3=UpperMV[bx+2] if (Block1|Block2) & Not_Upper_Edge&Right edge;
PMV3=MV1 if Block1 & Upper_Edge; and
PMV3=MV2 if Block3 & Block4.

21. A method of rapidly predicting motion vectors for luminance blocks within a macroblock, comprising:

generating a vertical descriptor of block position within the video object plane based on whether said block is located on an upper-edge (Upper_Edge) of said video object plane, or is not located on an upper edge (Not_Upper_Edge);

generating a horizontal descriptor of block position within the video object plane based on whether or not said block is located on a right-edge (Right_Edge), a left-edge (Left_Edge), or is not located on either edge (Not_Edge); and said horizontal and vertical descriptors comprise position categories in relation to the edges of the video object plane;

traversing a decision tree, with branches based on said edge position categories, to arrive at a subset of motion vector prediction rules;

generating a set of motion vector predictions in response to inputting a block number of said luminance blocks within each respective said subset of motion vector prediction rules as selected on the basis of location category in traversing the decision tree.

22. A method as recited in claim 21, wherein a separate said decision tree is traversed for each selected block number within the set of block numbers consisting of Block1, Block2, Block3, and Block4.

23. A method as recited in claim 22, wherein said set of motion vector predictors comprise three predictors, PMV1, PMV2, and PMV3, or equivalents.

24. A method as recited in claim 23, wherein said vector motion predictor PMV1 is calculated by evaluating the decision tree, comprising:

PMV1=0 if (Block1||Block3) & Left_Edge;
PMV1=LeftMV[0] if Block1 & Upper_Edge & Left_Edge;
PMV1=MV1 if Block2;
PMV1=LeftMV[1] if Block3 & & Left_Edge; and
PMV1=MV3 if Block4.

25. A method as recited in claim 23, wherein said vector motion predictor PMV2 is calculated by evaluating the decision tree comprising:

PMV2=0 if Block1 & Upper_Edge & Left_Edge;
PMV2=PMV1 if Block1 & Upper_Edge & Left_Edge;
PMV2=UpperMV[bx] (Block1 & Not_Upper_Edge)|(Block2 & Upper_Edge & Right_Edge);
PMV2=MV1 if (Block2 & Upper_Edge)|Block3|Block4; and
PMV2=UpperMV[bx+1] if Block2 & Not_Upper_Edge & !Not_Edge.

26. A method as recited in claim 23, wherein said vector motion predictor PMV3 is calculated by evaluating the decision tree, comprising:
- PMV3=0 if (Block1 & Upper_Edge & Left_Edge)|(Block1 & Not_Upper_Edge & Right_Edge)|(Block2 & Not_Upper_Edge & Left_Edge);
- PMV3=PMV2 if Block1 & Upper_Edge & Left_Edge;
- PMV3=UpperMV[bx+2] if (Block1|Block2) & Not_Upper_Edge&Right_edge;
- PMV3=MV1 if Block1 & Upper_Edge; and
- PMV3=MV2 if Block3 & Block4.

27. A method of rapidly predicting motion vectors for luminance blocks within a macroblock, comprising:
- generating a vertical descriptor of block position within the video object plane based on whether said block is located on an upper-edge (Upper_Edge) of said video object plane, or is not located on an upper edge (Not_Upper_Edge);
- generating a horizontal descriptor of block position within the video object plane based on whether or not said block is located on a right-edge (Right_Edge), a left-edge (Left_Edge), or is not located on either edge (Not_Edge);
- said horizontal and vertical descriptors comprise edge position categories in relation to the edges of the video object plane;
- traversing a decision tree to arrive at a subset of motion vector prediction rules based on block number and edge position category; and
- generating a set of motion vector predictions, PMV1, PMV2, and PMV3, in response to inputting a block number of said luminance blocks to each respective said subset of motion vector prediction rules as selected on the basis of location category in traversing the decision tree.

28. A method as recited in claim 27, wherein said vector motion predictor PMV1 is calculated within said decision tree comprising:
- PMV1=0 if (Block1||Block3) & Left_Edge;
- PMV1=LeftMV[0] if Block1 & Upper_Edge & Left_Edge;
- PMV1=MV1 if Block2;
- PMV1=LeftMV[1] if Block3 & & Left_Edge; and
- PMV1=MV3 if Block4.

29. A method as recited in claim 27, wherein said vector motion predictor PMV2 is calculated within said decision tree, comprising:
- PMV2=0 if Block1 & Upper_Edge & Left_Edge;
- PMV2=PMV1 if Block1 & Upper_Edge & Left_Edge;
- PMV2=UpperMV[bx] (Block1 & Not_Upper_Edge)|(Block2 & Upper_Edge & Right_Edge);
- PMV2=MV1 if (Block2 & Upper_Edge)|Block3|Block4; and
- PMV2=UpperMV[bx+1] if Block2 & Not_Upper_Edge & !Not_Edge.

30. A method as recited in claim 27, wherein said vector motion predictor PMV3 is calculated within said decision tree, comprising:
- PMV3=0 if (Block1 & Upper_Edge & Left_Edge)|(Block1 & Not_Upper_Edge & Right_Edge)|(Block2 & Not_Upper_Edge & Left_Edge);
- PMV3=PMV2 if Block1 & Upper_Edge & Left_Edge;
- PMV3=UpperMV[bx+2] if (Block1|Block2) & Not_Upper_Edge&Right_edge;
- PMV3=MV1 if Block1 & Upper_Edge; and
- PMV3=MV2 if Block3 & Block4.

31. A method of rapidly predicting motion vectors for luminance blocks within a macroblock, comprising:
- (a) generating a vertical descriptor of block position within the video object plane based on a determination of whether said block is located on an upper-edge (Upper_Edge) of said video object plane, or is not located on an upper edge (Not_Upper_Edge);
- (b) generating a horizontal descriptor of block position within the video object plane based on a determination of whether or not said block is located on a right-edge (Right_Edge), a left-edge (Left_Edge), or is not located on either edge (Not_Edge); and
- wherein said determination may be performed for a selected block number within the set of block numbers consisting of Block1, Block2, Block3, and Block4;
- (c) generating a set of motion vector predictions in response to a decision-tree correlating said block number of said luminance blocks with said location categories;
- wherein said set of motion vector predictors comprises three predictors, PMV1, PMV2, and PMV3, calculated by evaluating the decision tree as,
- PMV1=0 if (Block1||Block3) & Left_Edge,
- PMV1=LeftMV[0] if Block1 & Upper_Edge & Left_Edge,
- PMV1=MV1 if Block2,
- PMV1=LeftMV[1] if Block3 & & Left_Edge,
- PMV1=MV3 if Block4,
- PMV2=0 if Block1 & Upper_Edge & Left_Edge,
- PMV2=PMV1 if Block1 & Upper_Edge & Left_Edge,
- PMV2=UpperMV[bx] (Block1 & Not_Upper_Edge)|(Block2 & Upper_Edge & Right_Edge),
- PMV2=MV1 if (Block2 & Upper_Edge)|Block3|Block4,
- PMV2=UpperMV[bx+1] if Block2 & Not_Upper_Edge & !Not_Edge,
- PMV3=0 if (Block1 & Upper_Edge & Left_Edge)|(Block1 & Not_Upper_Edge & Right_Edge)|(Block2 & Not_Upper_Edge & Left_Edge),
- PMV3=PMV2 if Block1 & Upper_Edge & Left_Edge,
- PMV3=UpperMV[bx+2] if (Block1|Block2) & Not_Upper_Edge&Right_edge,
- PMV3=MV1 if Block1 & Upper_Edge,
- PMV3=MV2 if Block3 & Block4.

* * * * *